United States Patent Office 2,716,376
Patented Aug. 30, 1955

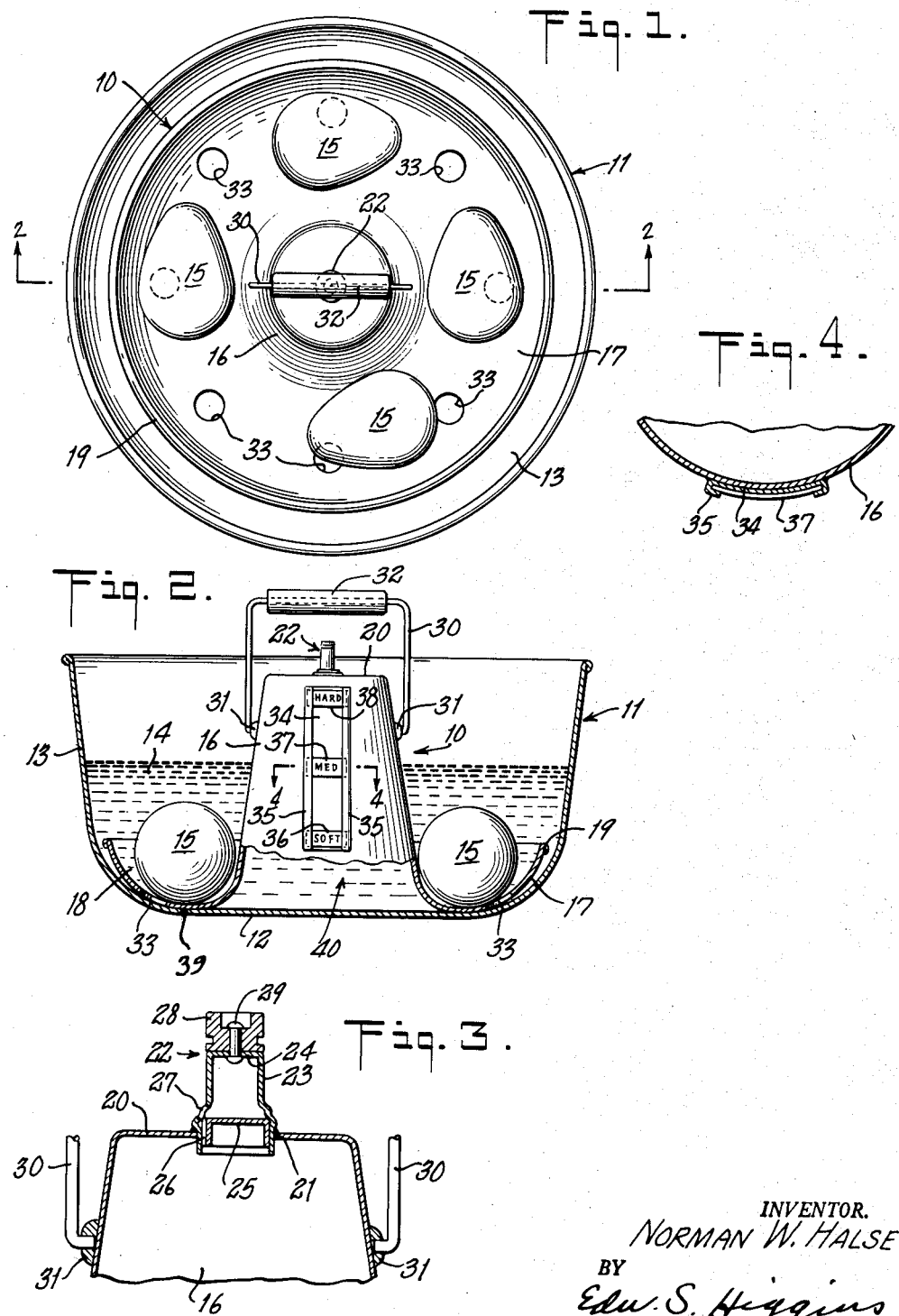

2,716,376

EGG TIMER AND HOLDER

Norman W. Halsey, Jackson Heights, N. Y.

Application October 27, 1953, Serial No. 388,561

1 Claim. (Cl. 99—344)

This invention relates generally to an egg cooker and more particularly to an egg timer of the audible signal type.

A principal object of the invention is to provide an egg timer that gives an audible signal when the egg or eggs have been cooked to the desired consistency.

Another object of the invention is to provide an egg timer that gives an audible signal when the egg or eggs are cooked soft, medium or hard.

Yet another object of the invention is to provide an egg timer with adjustable means for indicating the amount of water to be used in cooking the egg or eggs.

A further object is to provide an egg timer that serves to hold the egg or eggs while cooking and which serves as a convenient means for lifting the egg or eggs out of the water when cooked.

Still another object of the invention is to provide an egg timer that serves as a holder of the egg or eggs while cooling water is poured thereover.

A still further object is to provide an egg timer of this kind with means for draining off the water.

Another object of the invention is to provide an egg timer that indicates the amount of water necessary for cooking the egg or eggs to the desired consistency thereby saving water.

Another object of the invention is to provide an egg timer and holder, the body of which including the egg holding portion may be stamped in one piece at a low cost.

Other objects of the invention are to provide a combined egg timer and holder that is simple in construction, cheap to manufacture and sell, easily cleaned, characterized by fewness of parts, adapted to be used with either gas or electricity, easily manipulated, durable and permanent in character, and attractive in appearance.

For a further comprehension of the invention and of the objects and advantages thereof, reference will be had to the following description and accompanying drawing and to the appended claim in which the various novel features of the invention are more particularly set forth.

In the accompanying drawing forming a material part of this disclosure:

Fig. 1 is a top plan view of an egg timer and holder embodying the invention in position in a cooking vessel.

Fig. 2 is a vertical sectional view taken on the plane of the line 2—2 of Fig. 1.

Fig. 3 is an enlarged vertical sectional view of the whistle device.

Fig. 4 is an enlarged cross sectional view taken on the plane of the line 4—4 of Fig. 2.

Referring to the drawing in detail, the improved egg timer and holder 10 is illustrated in use with a large cylindrical cooking vessel or pot 11 having a flat bottom wall 12, a side wall 13 and an open top end containing water 14 for cooking eggs 15.

The egg timer and holder 10 comprises a tubular body or hollow cylindrical body 16 tapered downwardly and formed with a curved flange 17 around its open bottom, constituting a gutter 18. The flange terminates in a beaded portion 19. The top of the body 16 is closed by a wall 20 provided with a central opening 21. The body 16 is formed of one piece of suitable heat resisting material, preferably aluminum, which may be readily stamped out or spun.

A signal whistle device 22 is seated in the opening 21 in the top wall 20 and is secured and sealed therein by welding, soldering or any other suitable manner. The whistle device has a tubular metallic body 23 closed at one end by a wall 24 and closed at its other end by an inverted cup-shaped cap 25 fitted therein and secured to the inner surface of the body 23 in any suitable manner. At one point, the side wall of the cap 25 is pressed away from the surface of the body 23 to provide an entrance bore 26 which communicates with an exit opening 27 in the side wall of the tubular body 23. A block of wood 28 is secured to the top wall 24 by a rivet 29 and serves as a handle.

A bail member 30 is swivelly connected to socketed trunnions 31 on opposite sides of the tubular body 16 of the egg timer and holder 10 adjacent its top end as viewed in Fig. 2 and a handle 32 is supported on the crosspiece of the bail member.

A series of spaced openings 33 are formed around the curved flange 17 for drainage purposes.

An elongated frame 34 is secured to the outer surface of the tubular body 16 of the egg timer and holder 10 by spot welding or any other suitable manner. The frame has its long edges turned inwardly to form flanges 35 for frictionally holding slidable plates 36, 37 and 38 positioned at the top, middle and bottom as viewed in Fig. 2. The plate 36 is marked with the word "Soft," the plate 37 with the abbreviation "Med.," meaning medium, and the plate 38 with the word "Hard."

In operation, one or more eggs 15 are placed in the flanged gutter 18 of the egg timer and holder 10, and with the aid of the handle 32 the egg timer and holder is placed in the water in the larger outer vessel 11 as shown in Fig. 2, with the flange 17 forming a seal as indicated at 39. If it is desired to cook the eggs soft, only sufficient water is placed in the outer vessel to reach approximately the center of the plate 36 marked "Soft." If medium cooked eggs are desired, then the water level is placed approximately at the center of the plate 37 marked "Med.," and if hard eggs are desired, the water level is placed approximately at the center of the plate 38 marked "Hard." The plates are slidably mounted so that they may be initially adjusted up and down to the positions necessary for the desired degree of hardness, and after being once set need no further adjustment.

When the egg timer is positioned in the outer vessel, the water will rise in the inner chamber or compartment 39 formed by the tubular body 16 to a level corresponding to the level of the water in the outer vessel 11. When the heat is turned on and the water begins to heat, the eggs will start to cook and when the water is sufficiently heated to generate steam, the steam will pass upwardly through the entrance bore 26 in the whistle device 22 and out through the exit opening 27 causing a whistle sound and thus give a signal that the eggs are sufficiently cooked. Inasmuch as a smaller amount of water is necessary to cook an egg to a soft degree than to cook it to a medium or hard degree, the steam will be generated sooner and the signal will go off sooner. Similarly, the smaller amount of water necessary for medium cooking than for hard cooking will cause the signal to go off sooner than if the amount of water for hard cooking were used.

When the signal goes off, the timer and holder 10, with the cooked eggs in the gutter 18, is lifted out of the boiling water, the openings 33 in the gutter permitting the water to drain off of the eggs and out of the gutter into the outer vessel 11. If desired, the timer and holder with the supported eggs may then be readily placed under a cold water faucet and the cold water permitted to pour over the cooked eggs to cool them. The timer and holder serves as a very convenient and ready medium for this purpose.

While I have illustrated and described the preferred embodiments of my invention, it is to be understood that I do not limit myself to the precise construction herein disclosed and the right is reserved to all changes and modifications coming within the scope of the invention as set forth in the appended claim.

I claim:

An egg timer adapted to be submerged in a household vessel containing water, said timer comprising a conical-shaped tubular body closed at its upper end and open at the lower end, said closed end having an opening therein, a whistle device sealed in said opening, the lower end of said body being flared outwardly and upwardly to form an upwardly facing egg holding trough, a vertically extending channel member on the outer surface of said tubular body forming a holder for frictionally held marking indicia and a plurality of marking indicia in said holder, each of said marking indicia being slidable in said channel member to a separately adjustable position, whereby said timer may be initially calibrated to any size of vessel in which it may be used.

References Cited in the file of this patent

UNITED STATES PATENTS

| | | |
|---|---|---|
| 529,202 | Schramm | Nov. 13, 1894 |
| 2,513,593 | Smith | July 4, 1950 |

FOREIGN PATENTS

| | | |
|---|---|---|
| 440,250 | Germany | Jan. 29, 1927 |
| 560,818 | Germany | Oct. 7, 1932 |
| 809,345 | Germany | July 30, 1951 |